United States Patent
Howell

[11] Patent Number: 5,827,168
[45] Date of Patent: Oct. 27, 1998

[54] APPARATUS FOR STABILIZING A CENTRIFUGE ROTOR

[75] Inventor: Gary Wayne Howell, Elkton, Md.

[73] Assignee: Dade Behring Inc., Deerfield, Ill.

[21] Appl. No.: 944,062

[22] Filed: Oct. 1, 1997

Related U.S. Application Data

[63] Continuation of Ser. No. 640,391, Apr. 30, 1996, abandoned.

[51] Int. Cl.[6] .............................. B04B 9/00; B04B 13/00
[52] U.S. Cl. ................................. 494/7; 494/82; 494/83; 494/84; 74/574; 464/180
[58] Field of Search ................................ 494/1, 7, 9, 10, 494/12, 16, 20, 46, 47, 82, 83, 84; 210/144, 363; 74/572, 574; 68/23.1, 23.3; 464/180, 79, 80

[56] References Cited

U.S. PATENT DOCUMENTS

| | | |
|---|---|---|
| 1,501,187 | 7/1924 | Rayfield . |
| 1,752,106 | 3/1930 | Persons . |
| 2,951,731 | 9/1960 | Rushing . |
| 2,961,277 | 11/1960 | Sternlicht . |
| 3,232,076 | 2/1966 | Sundt . |
| 3,322,338 | 5/1967 | Stallman et al. . |
| 3,430,852 | 3/1969 | Lenkey et al. . |
| 3,455,013 | 7/1969 | Rayburn . |
| 3,524,332 | 8/1970 | Callies . |
| 3,702,545 | 11/1972 | Schlotmann et al. . |
| 3,727,429 | 4/1973 | Downey . |
| 3,740,968 | 6/1973 | Orain . |
| 3,747,366 | 7/1973 | Ruggen et al. . |
| 3,770,191 | 11/1973 | Blum ........................................ 494/46 |
| 3,888,093 | 6/1975 | Downey . |
| 3,902,659 | 9/1975 | Brinkmann et al. . |
| 3,955,377 | 5/1976 | Bendall . |
| 4,098,457 | 7/1978 | Gropper et al. . |
| 4,201,066 | 5/1980 | Nolan, Jr. ............................. 494/46 X |
| 4,236,426 | 12/1980 | Meinke et al. ........................... 74/574 |
| 4,334,718 | 6/1982 | Hirt et al. ......................... 464/180 X |
| 4,536,170 | 8/1985 | Downey .................................. 464/80 |
| 4,568,324 | 2/1986 | Williams .............................. 494/83 X |
| 4,846,773 | 7/1989 | Giebeler et al. ......................... 494/82 |
| 5,026,341 | 6/1991 | Giebeler ............................. 74/574 X |
| 5,342,282 | 8/1994 | Letourneur ............................... 494/82 |

FOREIGN PATENT DOCUMENTS

| | | |
|---|---|---|
| 0 070 157 A | 1/1983 | European Pat. Off. . |
| 1 419 237 | 10/1965 | France . |
| 1 632 298 | 12/1970 | Germany . |
| 2 112 834 | 10/1971 | Germany . |
| 1111362 | 4/1968 | United Kingdom . |
| 83/03985 | 11/1983 | WIPO ..................................... 494/83 |

*Primary Examiner*—Charles E. Cooley
*Attorney, Agent, or Firm*—Leland K. Jordan

[57] ABSTRACT

An apparatus to minimize vibrations of a centrifuge using sliding and damping bearings to restrain vertical movement of a disk rotatably attached to the centrifuge's drive shaft. Radial displacement of the disk beyond a predetermined distance activates the damping bearings against the disk.

1 Claim, 4 Drawing Sheets

APPARATUS FOR STABILIZING A CENTRIFUGE ROTOR

This is a continuation of application Ser. No. 08/640,391, filed on Apr. 30, 1996 abandoned.

FIELD OF THE INVENTION

The present invention relates to a method and apparatus for accomodating rotating bodies, and, in particular, to a method and apparatus for reducing vibrations induced in centrifuge rotors during rotor acceleration and deceleration through the critical and slew speeds of the rotor.

DESCRIPTION OF THE PRIOR ART

A centrifuge is an apparatus for subjecting a sample of a material to a centrifugal force in order to separate by density the sample into its constituent components. A common use for a centrifuge is in a clinical analytical laboratory where blood obtained from a patient is separated by centrifugal force into red cells and plasma components. The centrifuge includes a rotating member, or rotor, mounted for high speed rotational movement usually within a stationary, protective casing. The rotor may be outfitted with buckets or cavities which carry the sample to be separated during exposure to the centrifugal force.

The rotor is part of a centrifuge system that includes a motor or other source of motive energy, a drive shaft, and a rotor mounting device disposed at the upper end of the drive shaft on which the rotor is received. Like other mechanical devices or bodies that rotate at a high speed, the rotor has certain natural frequencies of vibration which become apparent when the rotor is rotating at certain critical speeds. The rotor normally rotates about its geometric center of gravity. At critical speeds (resonant frequencies of the rotor), the rotor tries to shift its axis of rotation laterally from that of the rotors geometric center to that of the rotors center of mass. This causes the rotor to vibrate. Further, if the rotor is unbalanced due to improper loading or otherwise, the vibrations are greatly magnified. During normal use, the rotor generally passes through its critical speed when accelerating from a stopped position to its operating speed, and after centrifugation is completed, when decelerating from its operating speed to a stopped position. Although the rotational energy of the system is low relative to the energy at much higher operating speeds, it is at this lower, so called "critical speed" of rotation that any imbalances in the rotor introduced typically by manufacturing tolerances tend to cause maximum vibrational amplitudes of the rotor. Typically, therefore, the centrifuge's rotor mount, or gyro, design is provided with some form of compliance mechanism which accomodates the forces generated by the system as the rotor's rotation approaches and traverses its critical speed.

When an operator is loading a centrifuge rotor, an important objective is achieving a weight-balanced, symmetrical sample distribution pattern about the drive shaft and instructions are normally provided to reach this objective. However, even reasonable balance is frequently not possible. For example, an emergency situation may require operating a centrifuge with only a partially filled rotor, or in an extreme situation, operating a centrifuge with only a single tube contained within the rotor. Thus a second important consideration in design of a centrifuge is reducing rotor vibrations arising from non-symmetrical sample loading conditions that may otherwise be capable of damaging the centrifuge. If not reduced or sufficiently dampened, the total imbalancing forces, arising from inherent rotor imbalances and/or sample loading patterns may result in premature failure of the centrifuge.

The problems associated with accelerating or decelerating a rotor through critical speed are well known and various mechanisms have been developed to reduce such vibrations and/or to assist in vibration damping.

U.S. Pat. No. 4,846,773 (Giebeler et al) discloses a vibration damper for a centrifuge in which the rotor drive shaft bearing has a frustoconical surface. Vibrations of the drive shaft traverse to its rotational axis and are transformed by means of the frustoconical surface into linear motion of a plunger concentrically mounted on the drive shaft. The plunger is mounted inside a solenoid and has its linear movement dampened by the solenoid.

U.S. Pat. No. 4,236,426 (Meinke et al) relates to a damping system for a centrifuge rotor in which springs, dampers, weights and/or attenuators are coupled and uncoupled with respect to the rotor. This alters the flexural properties of the rotor as its rotational speed approaches critical speed. The effect of these damping devices is to alter the critical speed of the rotor. The devices are activated and deactivated to facilitate the rotors passage through critical speed.

U.S. Pat. No. 4,098,457 (Gropper et al) relates to a floating stator pad attached to a stationary stator with means to increase the friction between the pad and the stator. Excessive vibrations of the rotor are transmitted by frictional contact to the stator pad. Gropper et al provide for increasing the frictional contact between the stator pad and stator so as to increase the efficiency of the stator pad in damping vibrations.

U.S. Pat. No. 3,322,338 (Stallman et al) discloses a centrifuge having a movable bearing assembly carried by a frame that supports a rotatable member coaxially with the axis of rotation of the motor. The rotatable member is movable between advanced and retracted positions to release the rotor and to engage the rotor to hold it in a defined axis of rotation. The rotatable member is permitted to move laterally within predetermined limits, thereby damping lateral rotor movement at critical transition speeds.

U.S. Pat. No. 2,961,277 (Sternlicht) discloses a bearing system in which a shaft has a frustoconical journal portion intermediate the ends of the shaft, which are supported on fixed bearings. A bearing is mounted on an adjustable support to be movable into or out of engagement with the frustoconical journal. The movable bearing is engaged with the journal before the shaft reaches the critical angular velocity and is disengaged from the shaft after the angular velocity is greater than the critical value.

U.S. Pat. No. 2,951,731 (Rushing) discloses a centrifuge having damping means including two sets of concentric, spaced apart cylindrical sleeves. The sleeves are arranged to follow shaft vibrations and overlap with other sleeves that are fixed with respect to the shaft. A viscous liquid is retained between the overlapping sleeves to damp out shaft vibrations.

U.S. Pat. No. 3,430,852 (Leukey et al) discloses a centrifuge rotor stabilizing device that frictionally contacts the rotor to provide stability at critical speeds.

These prior art approaches generally rely upon mechanical contact and associated forces to constrain the movement of the rotor. This is generally accomplished by shifting the vibration from the rotor to another mechanical component. This mechanical contact usually involves frictional contact to provide dissipative energy losses.

U.S. Pat. No. 3,902,659 (Brinkman et al.) discloses a rotor stabilizing device having an upper bearing formed of a first axially polarized magnetic ring and a second ring including a ferrite material. One of the rings is secured to the rotor, and the other ring is held stationary relative to the rotor. The rings are positioned such that oscillations of the rotor cause eddy currents in the induction ring, which absorbs the energy of the vibrations. Brinkman et al. are seen to overcome some of the prior art problems associated with the use of friction to alleviate vibration occurring at critical speeds. Unfortunately, their solution of using a magnetic coupling does not accomodate large critical speed vibrations well.

Consequently, it is desirable to provide a method to allow rotational acceleration of bodies through critical speed preferably without or with only minimal mechanical damping of the rotor. It is also believed advantageous to provide a method to reduce rotor vibrations arising from highly non-symmetrically load rotors.

SUMMARY OF THE INVENTION

The present invention overcomes many of the difficulties associated with the complex dynamics of known damping systems including those that require movement of mechanical devices and/or high friction interactions to accomodate vibrations that are generated within rotating systems, particularly in the instance of highly non-symmetrically loaded rotors.

The present invention relates to a method and apparatus for accomodating and/or restraining vibrations of a rotor used in a centrifuge instrument. The invention is an apparatus for accomodating vibrations in a centrifuge rotor comprising:

a drive shaft having a vertical axis for mounting a centrifuge rotor for rotation about said axis, driving means for rotating said shaft, bearing means mounted on said shaft, a disk mounted on said bearing means, whereby the disk can rotate about said shaft, and restraining means to limit the vertical movement of said disk, thereby to allow the rotor to rotate about its center of mass. A desirable feature of the invention includes means to sense the radial displacement of said disk, and means responsive to the radial displacement exceeding a predetermined value to restrain the rotation of said disk, thereby to damp vibrations of the centrifuge rotor.

Thus, the invention is seen to include a method for accomodating vibrations that occur in a body rotating about its geometric axis when the body passes through its critical speed, the body having a moment of inertia and a mass center, comprising the steps of:

maintaining the movement of inertia of the body, and allowing the body to shift its rotational axis to that of its mass center.

By providing a sliding support for a freely rotating disk mounted on the drive shaft of the rotor, the rotor is permitted to shift its spin axis to that of the center of mass. The invention thus adds radial mass to the rotor but not moment of inertia as do the prior art systems. This reduces the tendency of the rotor to vibrate even at critical speeds and does not slow the rotor speed to reduce vibrations even at critical speed as does much of the prior art. To the extent vibrations do occur, e.g., as with an unbalanced rotor, the rotor is peripherically gripped by sliding bearings to dampen by means of the disk such vibration. No elastomeric materials are used, hence oscillations due to spring constants are not precipitated. The apparatus of the invention is simple and does not require the use of complex rotating type dampeners.

BRIEF DESCRIPTION OF THE DRAWINGS

The several drawings taken in conjunction with the specification will provide a better understanding of the invention. In the drawings, like reference numerals are used for like components and in the drawings.

DESCRIPTION OF THE PREFERRED EMBODIMENT

Figure 1:
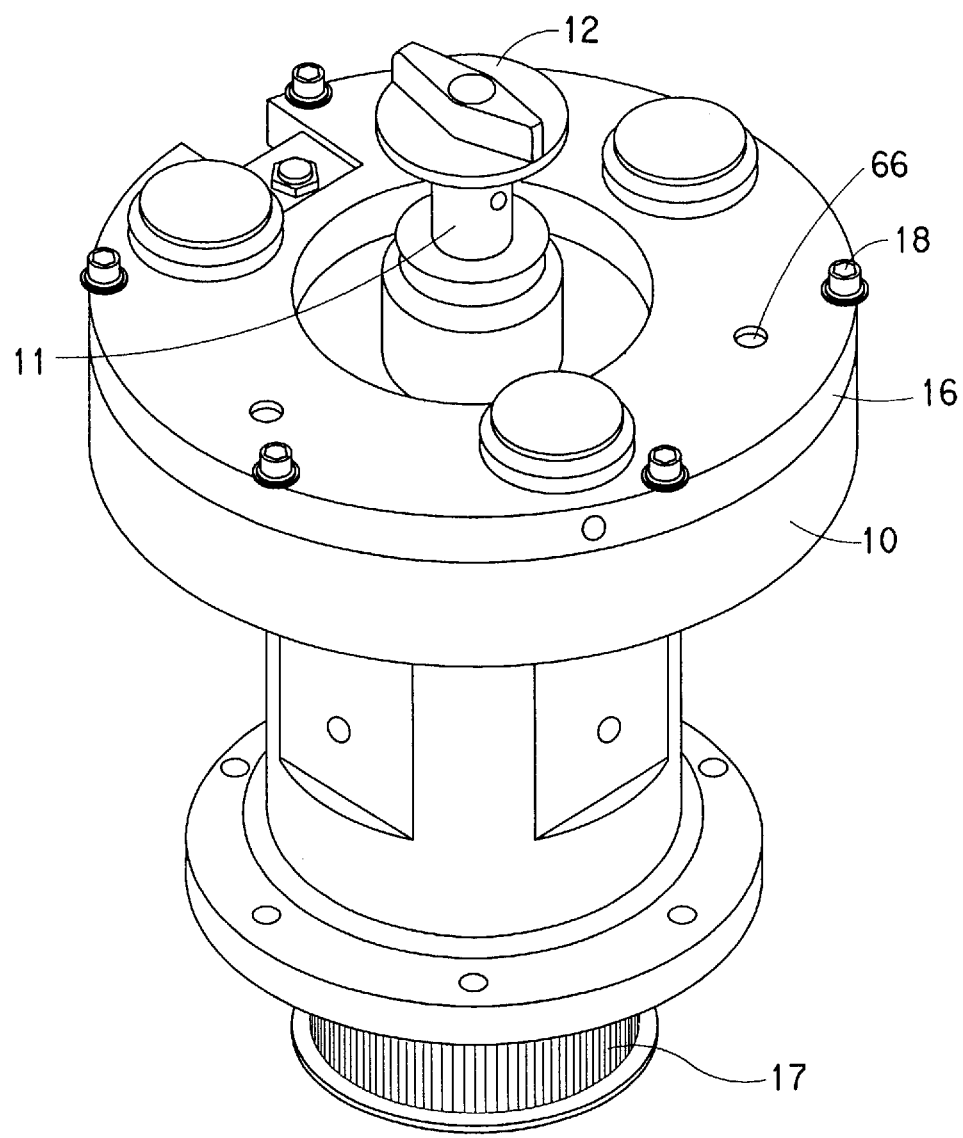
FIG. 1 is a perspective view of a centrifuge which uses a method and apparatus for reducing vibrations in the centrifuge rotor.
Figure 3:
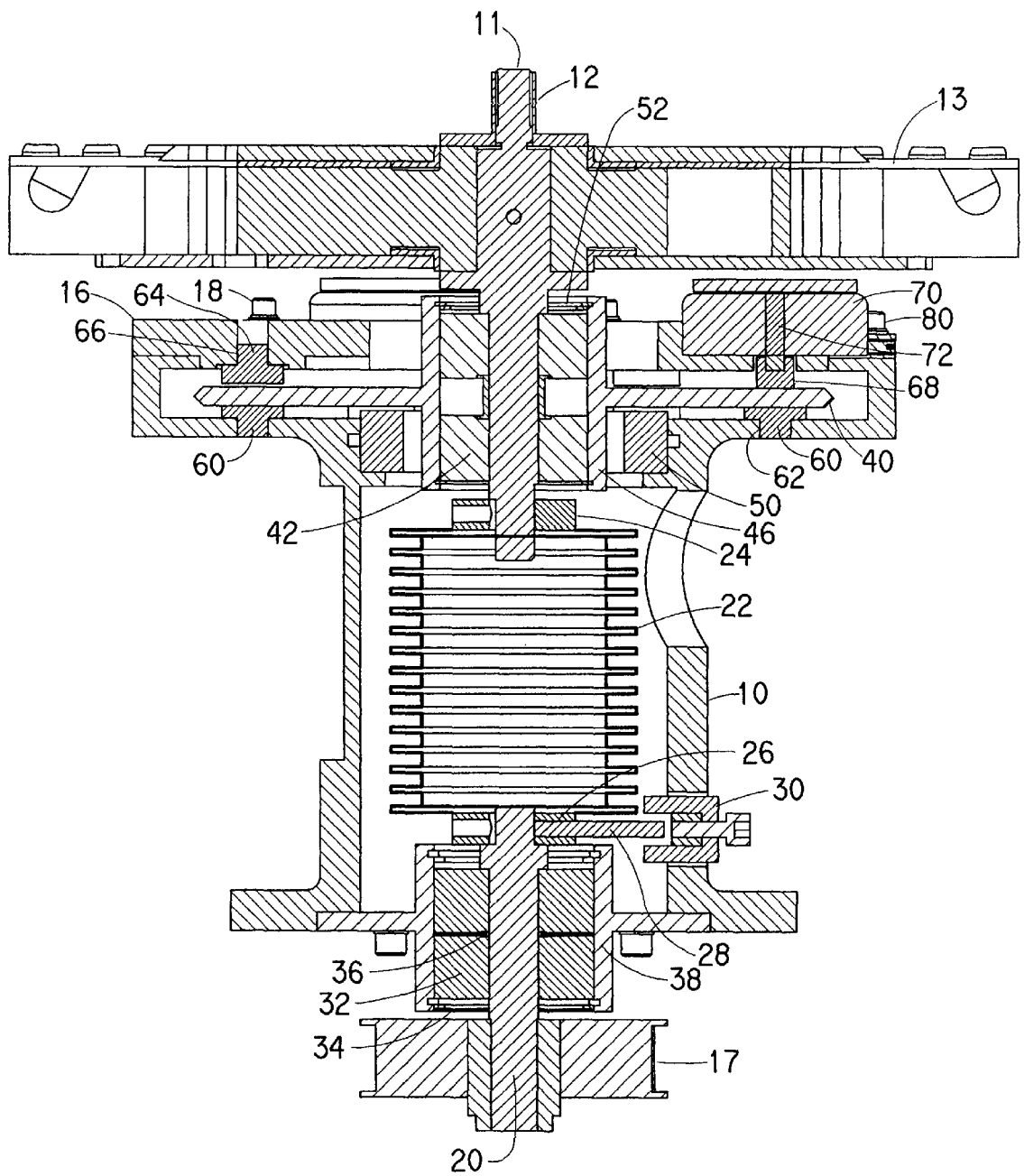
FIG. 3 is a cutaway elevation view of the gyro of FIG. 2.

There may be seen in FIG. 1 a rotating body vibration accomodating apparatus constructed in accordance with this invention. The apparatus illustrated is a gyro for a centrifuge rotor. The gyro includes an upper drive shaft 11 for driving and positioning or mounting the rotor (FIG. 3). A knob 12 is provided for securing such a rotor on the gyro. The vibration accomodating apparatus of this invention includes a housing 10 having a cap 16 secured thereto as by screws 18. At the lower portion of FIG. 1 is seen the drive pulley 17 which may be attached to a suitable motor (not shown) for rotating the upper drive shaft 11.

Figure 2:
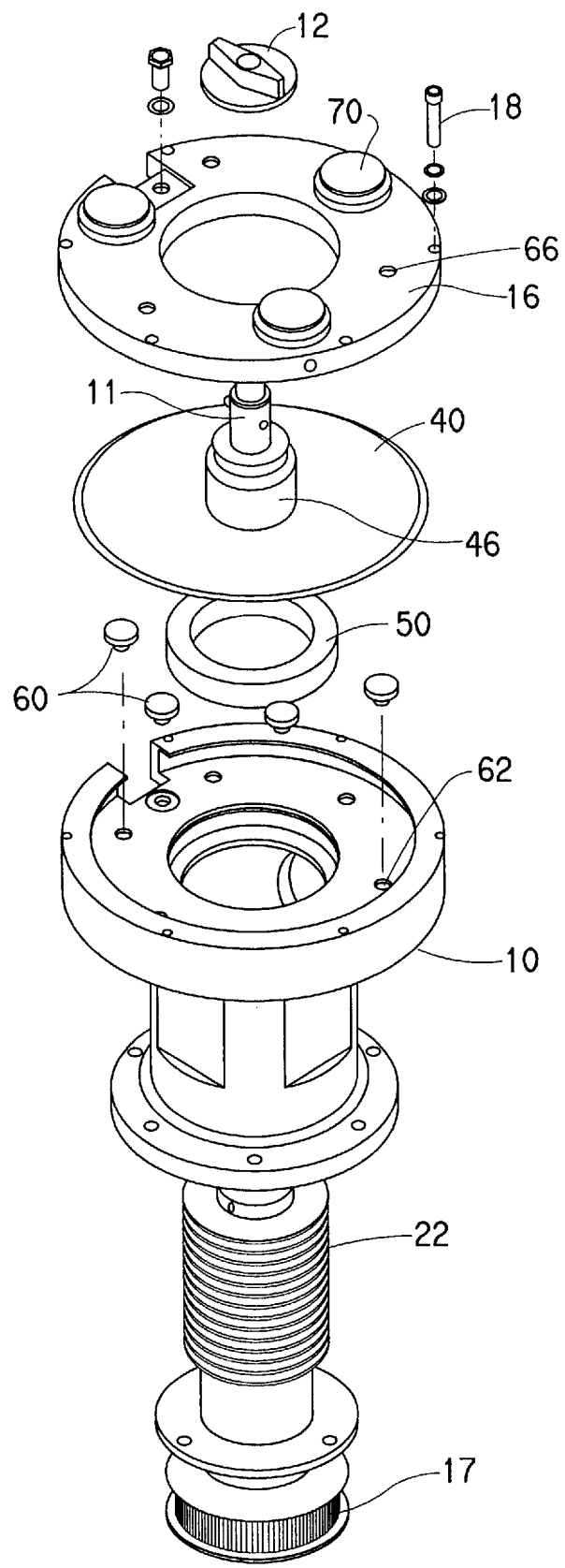
FIG. 2 is an exploded view of the gyro for the centrifuge depicted in FIG. 1.

Referring now to FIGS. 2 and 3, the details of the apparatus of this invention may be seen more clearly. At the upper portion of FIG. 3 there may be seen a rotor 13 which may be of a conventional type mounted to the upper shaft 11 and secured by the knob 12. The gyro is formed of two shafts, the upper shaft 11, as noted, and a lower drive shaft 20, the shafts being coupled together by a flexible coupling 22 which permits relative lateral motion (perpendicular to the axis of rotation of the shafts) between the two shafts. The flexible coupling 22 may be any suitable coupling of this type, one suitable coupling being that manufactured by Servometer Corporation. The flexible coupling 22 has upper and lower end cap mounts 24 and 26, respectively. Each has an end port for accomodating the respective drive shafts 20 and 11, respectively. The lower end cap mount 26 has a dowpin 28 mounted therein which is used as a flag for sensing the home position of the rotor (shafts). This position is sensed by a suitable transducer 30 which observes the position of the dowpin 28 and may be used in a known manner to control the position of the rotor.

The lower drive shaft 20 is secured by suitable ball bearings 32 positioned within a bearing housing 38 by appropriate washers and retaining rings 34. The ball bearings 32 are separated by a suitable spacer bearing 36. The bearing housing 38 is secured to the lower end of the housing 10 by suitable screws.

The upper drive shaft 11 is in the form of a stub, the lower end of which is secured in the upper end cap mount 24 and is positioned within disk bearings 42 which are housed by a bearing housing in the form of a hub 46 to which a disk 40 is integrally formed. The disk 40 preferably is formed of stainless steel and is positioned within the housing 10 whose upper end is generally cup-shaped and covered by the cap 16. The housing 10 has a counterbore in which is positioned a plastic boss 50 which acts as a bumper to stop radial movement of the upper drive shaft 11. The disk bearings 42 are secured at either end of the housing 46 by suitable washers and retaining rings 52.

In accordance with this invention, a plurality of restraining means preferably in the form of lower support sliding bearings 60 are positioned under the disk 40 to support its rotation in a horizontal plane. These lower support bearings 60 are positioned in recesses 62 formed in the lower portioned of the cap shaped portion of the housing 10 preferably at equally spaced circumferential positions (6 are shown). Correspondingly, three upper sliding bearings 64 are positioned in recesses 66, formed in the cap 16, which are positioned axially above the equally spaced, corresponding lower support bearings 60. The upper restraining bearings 64 are positioned, circumferentially spaced, only above three of the lower support bearings 60 allowing room for damping means in the form of solenoid activated damping bearings 68, which are positioned directly above the remaining, equally circumferentially spaced, support bearings 60.

The damping bearings 68 are actuated by three solenoids 70 which are countersunk in the cap 16 and operate to actuate a solenoid shaft 72 which is attached to the damping bearings 68. The bearings 68 may be formed of a suitable material such as Vespel™ synthetic resinous material with graphite having low sliding friction. The solenoids 70 are retained by an appropriate set screw 80. Correspondingly, the upper restraining bearings 64 may be formed of a suitable material such as Ertalyte™ polyester which has a low sliding friction. Actually, the sliding bearings may be formed of any suitable material which provides a low sliding friction, such as are: Teflon™ fluoropolymer, nylon, Delrin™ acetal copolymer, to name but a few. The upper bearings 64 and damping bearings 68 are positioned so that they either do not contact or lightly contact the upper side of the disk 40.

Figure 4:
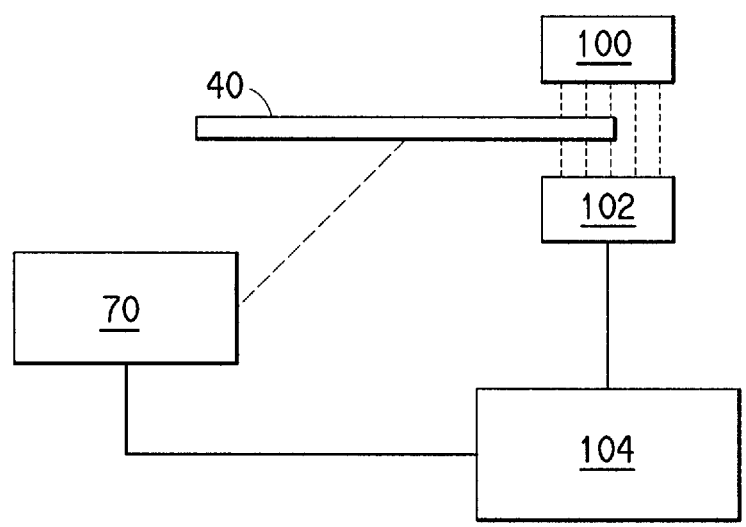
FIG. 4 is a block diagram of a vibration sensor used with the centrifuge accomodating apparatus of FIG. 1.

Control for the solenoid is provided by a mechanism such as that depicted in FIG. 4. In this figure, it is seen that the disk is illustrated as having a light emitting diode (LED) positioned close to the periphery and overlapping the outer radial limits of the disk 40. The LED 100 is directed downwardly to ward a suitable detector 102. Thus, a lateral movement of the disk 40 would vary the amount of light reaching the detector 102, signifying a greater or lesser degree of vibrations of the disk. The output of the detector 102 is coupled to a suitable, conventional controller 104 to control or activate the solenoids 70 to a greater or lesser degree, depending upon the amplitude of the vibrations of the disk 40 sensed by the detector 102. The solenoids 70, as described, direct the damping bearings 68 against the top face of the disk 40.

In operation, any imbalance forces generated by the rotation of the rotor as it accelerates or decelerates through critical speed manifest themselves as vibration. The flexible coupling 22, such as that provided by ServoMeter Company, Cedar Grove, N.J., permits the lateral motion of the upper shaft 11 relative to the lower shaft 20. The vibrations also manifest themselves in radial movement of the disk 40. In accordance with this invention, the disk 40 is free to move perpendicular to the axis of the rotation of the upper shaft 11. Because of the support provided by the lower support bearings 60 and the upper restraining bearings 64, the entire assembly, including the drive shaft and any rotors mounted, is allowed to shift laterally, i.e., perpendicular to the axis of rotation of the drive shaft 11, and thus accomodate such vibrations.

These vibrations are accomodated without applying any restraining force to the drive shafts and, hence, the center of rotation of the assembly is allowed to shift to rotate along the center of its mass. In other words, the apparatus of this invention adds radial mass but does not add moment of inertia because although the disk 40 is freely rotating because of the low friction of the disk bearings 42, the disk does not rotate with the velocity of the rotor because of the friction of the lower sliding bearings 60. The lower sliding bearings 60 merely support the disk and impose little or no friction on it. Hence, there is little or no change in moment of inertia (the ratio of angular torque to angular acceleration produced). Furthermore, it is noted that since no elastomeric materials are used, the problems associated with spring constants tending to perpetuate vibrations or activate vibrations are not inherent. This invention may be described as allowing true mass centering.

When excessive vibrations are detected by detector 102, solenoids 70 are activated causing the solenoid activated damping bearings 68 to be applied to the upper side of the disk 40, thereby damping further movement by the application of a sliding friction to the disk and limiting its ability to move in either the vertical or radial directions. Thus, it may be seen that the use of the disk 40 first accomodates vibration of the gyro and rotor and then, if such vibrations are excessive, further accomodates such vibrations by activating the damping bearings 68 to engage the side of the disk 40. At all times, whether the disk is rotating or not, since it is bearing mounted, it does not impede or reduce the torque applied to drive the rotor. The disk, by resisting vertical motion restrains oscillation which try to reposition the disk out of its plane of rotation.

I claim:

1. An apparatus for accommodating vibrations in a centrifuge comprising:

a rotor having a center of mass;

an upper drive shaft having an vertical axis, the shaft adapted for mounting and rotating the rotor;

a lower drive shaft connected to a source of rotation;

a flexible coupling for flexibly connecting the upper drive shaft to the lower drive shaft, said flexible coupling adapted to permit relative lateral motion between the upper drive shaft and the lower drive shaft;

a disk having lower sides and upper sides rotationally attached to the shaft using disk bearings;

sliding bearings positioned adjacent to the lower and upper sides of the disk and adapted to restrain movement of either side of the disk in an axial direction without appreciably affecting radial rotor motion;

damping bearings positioned against the upper side of the disk; and means to sense radial displacement of the disk and means responsive to the radial displacement exceeding a predetermined value, said responsive means adapted to position the damping bearings against the upper side of the disk, thereby to damp vibrations of the disk.

\* \* \* \* \*

UNITED STATES PATENT AND TRADEMARK OFFICE
CERTIFICATE OF CORRECTION

PATENT NO. : 5,827,168
DATED : October 27, 1998
INVENTOR(S) : Gary Wayne Howell

It is certified that error appears in the above-identified patent and that said Letters Patent is hereby corrected as shown below:

Column 6, Line 13: Delete "lower sliding" and insert --damping--.

Signed and Sealed this

Twenty-seventh Day of July, 1999

Attest:

Q. TODD DICKINSON

*Attesting Officer*    *Acting Commissioner of Patents and Trademarks*